July 4, 1950 W. TRAUPEL 2,513,601
GAS TURBINE PLANT
Filed Sept. 28, 1946
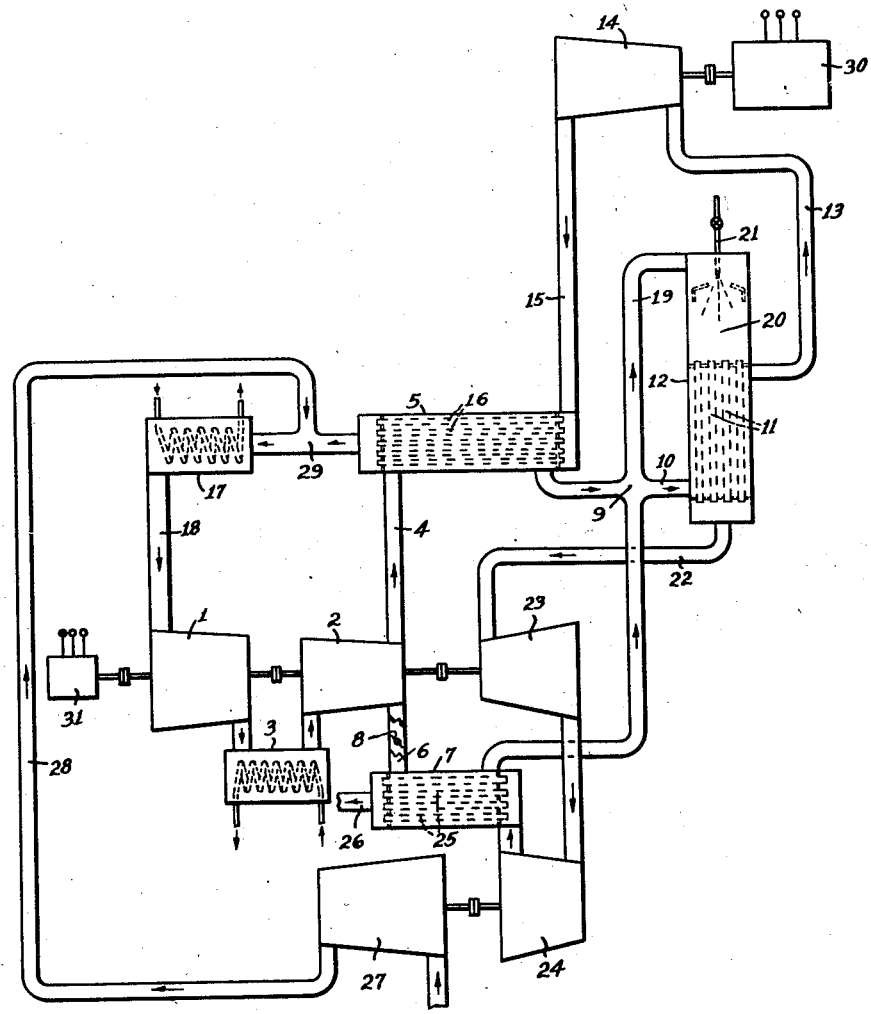
INVENTOR
*Walter Traupel*
BY
Pennie, Edmonds, Morton & Barrows
ATTORNEYS Patented July 4, 1950

2,513,601

UNITED STATES PATENT OFFICE 2,513,601

GAS TURBINE PLANT

Walter Traupel, Winterthur, Switzerland, assignor to Sulzer Freres, Societe Anonyme, Winterthur, Switzerland Application September 28, 1946, Serial No. 700,111
In Switzerland December 29, 1945

4 Claims. (Cl. 60—49)

This invention relates to a gas turbine plant in which a part of the working medium flows round in a circuit where it is compressed in at least one compressor and expanded in at least one turbine, a part of the working medium being continually taken from the said circuit and expanded in at least one turbine, and working medium being again introduced by at least one compressor into the said circuit to replace the quantity withdrawn. The invention is characterised by the plant compressors being driven by at least one turbine which is fed by the part of the working medium taken from the circuit, whilst the useful output is produced by a turbine which is fed by the working medium flowing round in the circuit.

The compressor in the circuit and the compressor delivering the make-up quantity of working medium can each be driven by a turbine, the turbine driving the compressor in the circuit being for example arranged before the turbine which drives the compressor delivering the make-up quantity. The working medium flowing round in the circuit may be compressed by a low-pressure and a high-pressure compressor which are driven in common by one turbine.

The accompanying drawing illustrates diagrammatically and by way of example how the invention may be carried out in practice.

Part of the air compressed by the compressors 1 and 2, with intermediate cooling in the cooler 3, is introduced through pipe 4 to a heat exchanger 5, and the remaining part through pipe 6 to a second heat exchanger 7, the distribution of air between them being suited to the working conditions by adjustment of the valve member 8 arranged in pipe 6. After leaving these heat exchangers which serve as preheaters, the two quantities of air unite again at point 9, where they are for a second time divided into two parts. One part flows through pipe 10 into the space surrounding the tubes 11 of a gas heater 12. In the heated state the compressed air then passes through pipe 13 into a turbine 14, where it expands and cools and gives up part of its energy to the rotor. The expanded air flows back through pipe 15 into the heat exchanger 5, in which when flowing through the tubes 16 it preheats the quantity of compressed air led in through pipe 4. After leaving the heat exchanger 5, still a further part of its residual heat is withdrawn in the cooler 17. The now cooled air flows through pipe 18 back to the compressor 1, where the circuit begins again.

From the air circuit described, a quantity of working medium is constantly extracted at spot 9 and led through pipe 19 into the combustion space 20 of the gas heater 12. Here, it is used for burning the fuel atomised through a burner 21. The combustion gas flows through the heat exchanger tubes 11 of the gas heater 12, so that the air flowing round in the circuit is heated. After transferring a part of its heat, the combustion gas flows through pipe 22 into a second turbine 23 and from this into a third turbine 24. The combustion gas thus expanded is delivered finally to the tubes 25 of the preheater 7 and then passes through pipe 26 to further points of use not shown, for instance to a waste heat recovery plant, or it may pass direct to atmosphere. In the heat exchanger 7 a part of the residual heat of the combustion gas is given up to part of the air flowing round in the circuit and introduced through pipe 6.

To replace the part of the working medium taken from the circuit at point 9, air is taken from the atmosphere through a second compressor 27, compressed and introduced through pipe 28 into the pipe 29 that connects the heat exchanger 5 with the cooler 17. When working with normal load, the air is compressed by the compressor 27 to about 3 atmospheres gauge, at which pressure it flows to the low-pressure compressor 1. At the outlet from the high-pressure compressor 2 the air of the circuit has been compressed to a final pressure of about 12 atmospheres gauge. In the turbine 14 the pressure of the air is again reduced to 3 atmospheres gauge, while doing work. For changing the output, the compression ratio of the compressor 27 is altered by for instance altering the speed of the turbine 24. At no load the compressor compresses the air to about 0.2 atmosphere gauge, at the highest overload to about 3.5 atmospheres gauge, or still higher. The maximum pressure in the circuit at the outlet from the high-pressure compressor 2 becomes 3 atmospheres gauge at no load and 16 atmospheres gauge at overload. The compression ratio in the circuit is consequently also changed with a change in the output, being considerably smaller with a low output than with a high one. By the alteration of the compression ratio in the circuit, the regulating range may be considerably extended without having to put up with economical drawbacks. If it is desirable to do so without particularly high efficiencies, the output of the plant may be still further increased by raising the pressure of the make-up air, already at normal load, to for instance 4–5 atmospheres gauge. The maximum pressure in the circuit at normal load will then rise to 20 atmospheres gauge and even higher.

The turbine 14 fed with air from the circuit develops the useful output. It drives an electric generator 30, which supplies, for instance, an existing network. The turbine 23 which is first fed with exhaust gas from the gas heater drives the low-pressure compressor 1 and the high-pressure compressor 2 of the circuit. To the group of machines consisting of the compressors 1 and 2 and the turbine 23, an electric auxiliary machine 31 is also coupled, which according to requirements may come into operation as a motor or as a generator. It serves on the one hand for starting the plant and on the other hand for compensating for any lack of output or for any excess of output at the turbine 23. The turbine 24 fed with exhaust gas from the turbine 23 drives the compressor 27 which introduces the make-up air into the circuit. The power required for driving all the compressors in the plant is consequently generated only by the part of the working medium taken from the circuit and the useful output is only produced by the part of the working medium flowing round in the circuit.

If particularly high efficiencies can be foregone, the heat exchanger 7, through which the working medium taken from the circuit flows could be omitted. From the last turbine 24 through which it passes, the working medium taken from the circuit would then flow direct to atmosphere or to exhaust heat recuperators not shown in the drawing. For compressing the working medium flowing round in the circuit, only one compressor could also be used, to which an intermediate cooler might be connected. In special cases, further simplifying of the plant could be obtained by having all compressors driven by one single turbine. The simplest case would then arise when a single compressor for the working medium flowing round in the circuit and a compressor for the working medium to be introduced as make-up into the circuit, are both driven in common by one turbine. On the other hand, if an endeavour is made to obtain particularly high efficiencies, an intermediate gas heater could be fitted between the two turbines which are fed with working medium taken from the circuit. Finally, also an auxiliary turbine could be provided which has to drive auxiliary machines and is fed either with the working medium in the circuit or with working medium taken from the circuit.

I claim:

1. A gas turbine plant of the semi-closed circuit type which includes a circuit for working medium, said circuit including a circuit compressor, a gas heater, a circuit turbine, a recuperator and conduit for conducting working medium through said elements in the order named, a make-up branch leading into said conduit, a make-up compressor discharging into said make-up branch, an extraction branch leading from said circuit between said circuit compressor and said gas heater, a combustion chamber fed from said extraction branch and arranged to heat said gas heater, and one or more extraction turbines fed by the combustion products from said combustion chamber, characterized by the arrangement of said circuit turbine to drive the plant load and the arrangement of said extraction turbine or turbines to drive said compressors.

2. A plant according to claim 1 further characterized by the provision of separate extraction turbines to drive the circuit and make-up compressors respectively.

3. A plant according to claim 2 further characterized by the arrangement of the extraction turbine driving the circuit compressor in series with and before the extraction turbine driving the make-up compressor.

4. A plant according to claim 1 further characterized in that a single extraction turbine drives in common a low pressure and a high pressure compressor arranged in series in the circuit.

WALTER TRAUPEL.

REFERENCES CITED

The following references are of record in the file of this patent:

UNITED STATES PATENTS

| Number | Name | Date |
|---|---|---|
| 2,268,270 | Traupel | Dec. 30, 1941 |
| 2,298,663 | Traupel | Oct. 13, 1942 |
| 2,392,623 | Traupel | Jan. 8, 1946 |

FOREIGN PATENTS

| Number | Country | Date |
|---|---|---|
| 378,229 | Italy | Jan. 25, 1940 |
| 213,793 | Switzerland | June 3, 1941 |